United States Patent
Ma et al.

(10) Patent No.: US 11,706,389 B2
(45) Date of Patent: Jul. 18, 2023

(54) DATA TRANSMISSION METHOD, CAMERA AND ELECTRONIC DEVICE

(71) Applicant: Hangzhou Hikvision Digital Technology Co., Ltd., Zhejiang (CN)

(72) Inventors: Qiang Ma, Zhejiang (CN); Xinyu Gu, Zhejiang (CN)

(73) Assignee: Hangzhou Hikvision Digital Technology Co., Ltd., Zhejiang (CN)

(*) Notice: Subject to any disclaimer, the term of this patent is extended or adjusted under 35 U.S.C. 154(b) by 187 days.

(21) Appl. No.: 16/622,582

(22) PCT Filed: Sep. 6, 2018

(86) PCT No.: PCT/CN2018/104341
§ 371 (c)(1),
(2) Date: Dec. 13, 2019

(87) PCT Pub. No.: WO2019/076155
PCT Pub. Date: Apr. 25, 2019

(65) Prior Publication Data
US 2021/0152782 A1    May 20, 2021

(30) Foreign Application Priority Data
Oct. 20, 2017   (CN) .......................... 201710984275.7

(51) Int. Cl.
*H04N 7/00*       (2011.01)
*H04N 7/18*       (2006.01)
(Continued)

(52) U.S. Cl.
CPC ......... *H04N 7/181* (2013.01); *H04N 1/00204* (2013.01); *H04N 7/10* (2013.01); *H04N 21/23418* (2013.01)

(58) Field of Classification Search
CPC ...................................................... H04N 7/181
(Continued)

(56) References Cited

U.S. PATENT DOCUMENTS

| | | | |
|---|---|---|---|
| 7,034,880 B1* | 4/2006 | Endsley ............. | H04N 1/00132 348/207.1 |
| 2006/0066725 A1* | 3/2006 | Dodrill ............. | H04N 5/23203 348/207.99 |

(Continued)

FOREIGN PATENT DOCUMENTS

| | | | |
|---|---|---|---|
| CN | 102056015 A | 5/2011 | |
| CN | 102291524 A | 12/2011 | |

(Continued)

*Primary Examiner* — Daniel T Tekle
(74) *Attorney, Agent, or Firm* — Bret E. Field; Bozicevic, Field & Francis LLP (57) ABSTRACT

Embodiments of the present application provide a data transmission method, a camera and an electronic device. The method includes: acquiring to-be-sent target data; and sending the target data, as data carried in an effective image area of a first image frame, by using a data sending manner for the effective image area, through a same transmission channel as used in transmitting image data; wherein, the target data is different from the image data and coaxial data, the coaxial data is notification information for an interaction between a data receiving end and a data sending end, and the first image frame has a different type from a second image frame carrying the image data without carrying the target data. Applying the solutions provided by the embodiments of the present application, the transmission of the target data can be realized without additional wiring, thereby reducing the device cost.

12 Claims, 3 Drawing Sheets

(51) Int. Cl.
*H04N 1/00* (2006.01)
*H04N 7/10* (2006.01)
*H04N 21/234* (2011.01)

(58) Field of Classification Search
USPC .......................................................... 348/143
See application file for complete search history.

(56) References Cited

U.S. PATENT DOCUMENTS

| | | |
|---|---|---|
| 2011/0038594 A1 | 2/2011 | Symons et al. |
| 2012/0092494 A1 | 4/2012 | Garoutte et al. |
| 2013/0128050 A1* | 5/2013 | Aghdasi .............. G06K 9/3241 |
| | | 348/158 |
| 2014/0022384 A1 | 1/2014 | Tomiyama |
| 2015/0341599 A1 | 11/2015 | Carey |
| 2017/0280087 A1 | 9/2017 | Kuo |

FOREIGN PATENT DOCUMENTS

| | | |
|---|---|---|
| CN | 102932648 A | 2/2013 |
| CN | 104079873 A | 10/2014 |
| CN | 104601940 A | 5/2015 |
| CN | 105554366 A | 5/2016 |
| CN | 105594173 A | 5/2016 |
| CN | 105791752 A | 7/2016 |
| CN | 107155051 A | 9/2017 |

* cited by examiner

FIG. 6

DATA TRANSMISSION METHOD, CAMERA AND ELECTRONIC DEVICE

The present application claims the priority to Chinese Patent Application No. 201710984275.7, filed with the China National Intellectual Property Administration on Oct. 20, 2017 and entitled "DATA TRANSMISSION METHOD, CAMERA AND ELECTRONIC DEVICE", which is incorporated into the present application by reference in its entirety.

TECHNICAL FIELD

The present application relates to the field of signal transmission technology, and in particular, to a data transmission method, a camera and an electronic device.

BACKGROUND

Figure 1:
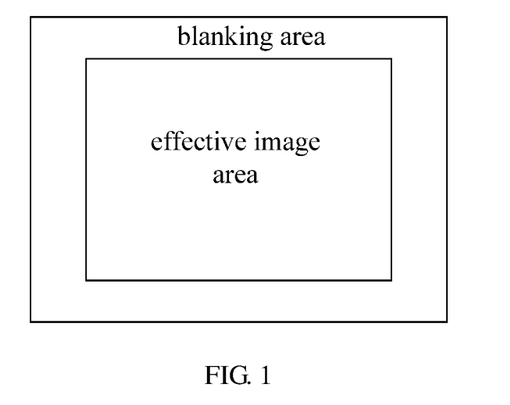
FIG. 1 is a schematic structural diagram of an image frame.

In a monitoring system, an image capture device (such as a camera) may send a captured image to an electronic device, and the electronic device may receive and store the image sent by the image capture device, and then display a monitoring video. Furthermore, the image capture device may send coaxial data together with the image to the electronic device. The coaxial data is notification information in an interaction between devices. An image frame sent between the devices may be as shown in FIG. 1, and the image frame includes an effective image area and a blanking area. In sending the image frame, the image is usually taken as data of the effective image area, and the coaxial data is usually taken as data of the blanking area.

In the related art, the above described image frame is usually transmitted between devices using a coaxial cable or a twisted pair. If target data other than the image and the coaxial data is to be transmitted, an additional wiring will be arranged between the devices. However, this method will increase device cost.

SUMMARY

The object of embodiments of the present application is to provide a data transmission method, a camera and an electronic device, so as to achieve the transmission of other data without any additional wiring. Specifically, the technical solutions are as follows.

An embodiment of the present application provides a data transmission method including:

acquiring to-be-sent target data, wherein the target data is different from image data and coaxial data, and the coaxial data is notification information for an interaction between a data receiving end and a data sending end; and sending the target data, as data carried in an effective image area of a first image frame, by using a data sending manner for the effective image area, through a same transmission channel as used in transmitting the image data; wherein the first image frame has a different type from a second image frame carrying the image data without carrying the target data.

Optionally, before sending the target data, the method further includes:

when it is determined that a preset number of second image frames have been continuously sent, performing the step of sending the target data.

Optionally, when the sending of the target data is completed, the method further includes: continuously sending the preset number of second image frames.

Optionally, before sending the target data, the method further includes:

when it is determined that an amount of the to-be-sent target data reaches a preset data amount threshold, performing the step of sending the target data.

Optionally, before sending the target data, the method further includes:

acquiring to-be-sent coaxial data; and sending the coaxial data, as data carried in a blanking area of the first image frame in which the target data is located, by using a data sending manner for the blanking area.

Optionally, the coaxial data further includes:

a coaxial data identifier indicating that data in the effective image area of the image frame is the target data.

Optionally, the target data includes:

target data indicating environmental information of an environment in which an image capture device is located, of the image data; and/or, target data indicating audio information captured by the image capture device, of the image data; and/or, target data indicating image information of the image data.

An embodiment of the present application provides a data transmission method including:

receiving a first image frame whose effective image area carries target data, through a same transmission channel as used in transmitting image data; wherein the target data is different from image data and coaxial data, the coaxial data is notification information for an interaction between a data receiving end and a data sending end, and the first image frame has a different type from a second image frame carrying the image data without carrying the target data; and acquiring the target data from the effective image area by using a data acquisition manner for the effective image area.

Optionally, receiving a first image frame whose effective image area carries target data includes:

when it is determined that a preset number of second image frames have been continuously received, receiving an image frame and determining the received image frame as the first image frame whose effective image area carries the target data.

Optionally, after receiving the first image frame, the method further includes:

continuously receiving the preset number of second image frames.

Optionally, a blanking area of the first image frame carries the coaxial data; after receiving the first image frame, the method further includes:

acquiring the coaxial data from the blanking area by using a data acquisition manner for the blanking area.

Optionally, the coaxial data is acquired before the target data is acquired; before acquiring the target data from the effective image area, the method further includes:

when it is determined that the coaxial data includes a coaxial data identifier indicating that data in the effective image area of the image frame is the target data, performing the step of acquiring the target data from the effective image area.

An embodiment of the present application provides a camera including: a processor, a communication interface, a memory and a communication bus; wherein, the processor, the communication interface and the memory communicate with each other via the communication bus;

the processor is configured for: acquiring to-be-sent target data; and sending the target data, as data carried in an effective image area of a first image frame, by using a data sending manner for the effective image area, through a same transmission channel as used in transmitting the image data; wherein the target data is different from image data and coaxial data, the coaxial data is notification information for an interaction between a data receiving end and a data sending end, and the first image frame has a different type from a second image frame carrying the image data without carrying the target data; and the memory is configured for storing the target data acquired by the processor.

Optionally, the processor is further configured for: before sending the target data, when determining that a preset number of second image frames have been continuously sent, sending the target data, as data carried in the effective image area of the first image frame, by using the data sending manner for the effective image area, through the same transmission channel as used in transmitting the image data.

Optionally, the processor is further configured for: when the sending of the target data is completed, continuously sending the preset number of second image frames.

Optionally, the processor is further configured for: before sending the target data, when determining that an amount of the to-be-sent target data reaches a preset data amount threshold, sending the target data, as data carried in the effective image area of the first image frame, by using the data sending manner for the effective image area, through the same transmission channel as used in transmitting the image data.

Optionally, the processor is further configured for: before sending the target data, acquiring to-be-sent coaxial data, and sending the coaxial data, as data carried in a blanking area of the first image frame in which the target data is located, by using a data sending manner for the blanking area.

Optionally, the coaxial data further includes: a coaxial data identifier indicating that data in the effective image area of the image frame is the target data.

Optionally, the target data includes: target data indicating environmental information of an environment in which an image capture device is located, of the image data; and/or, target data indicating audio information captured by the image capture device, of the image data; and/or, target data indicating image information of the image data.

An embodiment of the present application provides an electronic device including: a processor, a communication interface, a memory and a communication bus; wherein, the processor, the communication interface and the memory communicate with each other via the communication bus;

the processor is configured for: receiving a first image frame whose effective image area carries target data, through a same transmission channel as used in transmitting image data; and acquiring the target data from the effective image area by using a data acquisition manner for the effective image area; wherein the target data is different from image data and coaxial data, the coaxial data is notification information for an interaction between a data receiving end and a data sending end, and the first image frame has a different type from a second image frame carrying the image data without carrying the target data; and the memory is configured for storing the target data acquired by the processor.

Optionally, the processor, when receiving the first image frame whose effective image area carries target data, is configured for: when determining that a preset number of second image frames have been continuously received, receiving an image frame and determining the received image frame as the first image frame whose effective image area carries the target data.

Optionally, the processor is further configured for: after receiving the first image frame, continuously receiving the preset number of second image frames.

Optionally, a blanking area of the first image frame carries the coaxial data; the processor is further configured for: after receiving the first image frame, acquiring the coaxial data from the blanking area by using a data acquisition manner for the blanking area.

Optionally, the coaxial data is acquired before the target data is acquired; the processor is further configured for: when determining that the coaxial data includes a coaxial data identifier indicating that data in the effective image area of the image frame is the target data, acquiring the target data from the effective image area by using the data acquisition manner for the effective image area.

An embodiment of the present application provides a computer readable storage medium for storing a computer program, wherein the computer program, when executed by a processor, performs the data transmission method provided by the embodiment of the present application. The data transmission method includes:

acquiring to-be-sent target data, wherein the target data is different from image data and coaxial data, and the coaxial data is notification information for an interaction between a data receiving end and a data sending end; and sending the target data, as data carried in an effective image area of a first image frame, by using a data sending manner for the effective image area, through a same transmission channel as used in transmitting the image data; wherein the first image frame has a different type from a second image frame carrying the image data without carrying the target data.

An embodiment of the present application provides a computer readable storage medium for storing a computer program, wherein the computer program, when executed by a processor, performs the data transmission method provided by the embodiment of the present application. The data transmission method includes:

receiving a first image frame whose effective image area carries target data, through a same transmission channel as used in transmitting image data; wherein the target data is different from image data and coaxial data, the coaxial data is notification information for an interaction between a data receiving end and a data sending end, and the first image frame has a different type from a second image frame carrying the image data without carrying the target data; and acquiring the target data from the effective image area by using a data acquisition manner for the effective image area.

In the data transmission method, the camera and the electronic device provided by the embodiments of the present application, to-be-sent target data may be acquired, and the target data is sent, as data carried in an effective image area of a first image frame, by using a data sending manner for the effective image area, through a same transmission channel as used in transmitting the image data, wherein, the first image frame has a different type from a second image frame carrying the image data without carrying the target data. Therefore, the solution provided by the embodiments of the present application can realize that the target data is sent to the electronic device through the same transmission channel as used in transmitting the image data without additional wiring, thereby reducing the device cost.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The technical solutions of embodiments of the present application will be described in more detail below with reference to the appended drawings. Obviously, the described embodiments are only some, and not all, of the embodiments of the present application. All other embodiments obtained based on the embodiments of the present application by those skilled in the art without any creative efforts fall into the scope of protection defined by the present application.

In the related art, image data and coaxial data can only be transmitted between devices through a transmission medium such as a coaxial cable or a twisted pair. If data other than the image data and the coaxial data is to be transmitted, an additional wiring is required.

In order to avoid the additional wiring and realize the transmission of the target data, an embodiment of the present application provides a data transmission method, a camera and an electronic device. The present application will be described in detail below through specific embodiments.

Figure 2:
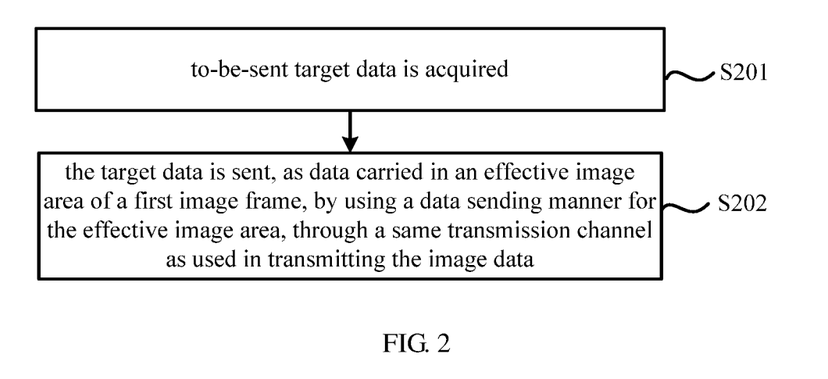
FIG. 2 is a flowchart of a data transmission method according to an embodiment of the present application.

FIG. 2 is a flowchart of a data transmission method according to an embodiment of the present application. The embodiment is applied to a data sending end which may be a camera, a computer, a smart phone or other devices with data processing function. The method includes the following steps S201-S202.

At step S201, to-be-sent target data is acquired.

The target data is different from the image data and the coaxial data. The image data may be understood as image data in a data stream sent by the data sending end to the data receiving end. The data sending end may acquire the to-be-sent image data, and send the image data to the data receiving end. For example, the data sending end may be an image capture device, and the image capture device may capture image data and send the captured image data to the data receiving end.

The coaxial data is notification information for an interaction between the data receiving end and the data sending end. The coaxial data may also be called PTZ data. When the data sending end and the data receiving end are a video generation end and a video receiving end, respectively, the coaxial data of an interaction between the video generation end and the video receiving end may include coaxial sending data sent by the video generation end to the video receiving end, or may also include coaxial receiving data sent by the video receiving end to the video generation end. For example, when the video generation end is a camera and the video receiving end is a digital video recorder (DVR), the coaxial data may include shooting mode information, information ready for upgrading, and the like sent by the camera to the DVR, and may also include handshake data between the camera and the DVR. The handshake data may be used for sending data indicating device type and image resolution, and so on. The coaxial data may further include control information sent by the DVR to the camera. The control information may include control instructions for the camera, such as an image parameter adjustment instruction, a camera aperture adjustment instruction, a camera rotation adjustment instruction, a resolution switching instruction, a remote upgrade data instruction, and so on. The coaxial data may further include information such as a position of the image data in an image frame, a position of the target data in the image frame, and the like.

The coaxial data may or may not be included in the image frame.

In this step, the target data may include at least one of the following manners.

Manner one: target data indicating environmental information of an environment in which the image capture device is located, of the image data.

For example, the target data in the present embodiment may be temperature information, humidity information, air pressure information, noise information, negative ion concentration, and the like. Correspondingly, one or more of a temperature sensor, a humidity sensor, an air pressure sensor, a noise sensor, a negative ion sensor, and the like may be integrated into the image capture device. The above sensors may not be integrated into the image capture device, but be installed at the same position as that of the image capture device.

The image capture device may receive the captured data sent by each of the sensors.

When the data sending end as an executor is not the image capture device, the data sending end may acquire the target data captured by the sensors inside the image capture device, or the data sending end may directly acquire the target data sent by the sensors.

When the data sending end as the executor is the image capture device, the image capture device may directly acquire the target data sent by the sensors.

Manner two: target data indicating audio information captured by the image capture device, of the image data.

The audio information captured by the image capture device may be audio information captured within a preset time period. The preset time period may be a continuous time period or multiple time periods that are not continuous. The preset time period may or may not include a moment at which the target data is acquired. The preset time period may be fixed or variable.

Manner three: target data indicating image information of the image data.

The image information may be information obtained from one or more pieces of image data. The image information may include image sub-data that meets a preset image feature and is obtained from the image data, and may also include information for describing the image sub-data. For example, the image sub-data may indicate a moving object in the image data, or an occluded object in the image data, or an abnormality in the image data (for example, image overexposure, blurring, or color distortion, etc.), or a special scene in the image data (for example, an object goes beyond a predetermined limit, etc.). The object may include a human body, a vehicle, an animal, a building, and the like. The information for describing the image sub-data may be the number of images corresponding to the image sub-data, an image position corresponding to the image sub-data, or the like, or be an image encoding format, a video encoding format, private information or the like. The image encoding format may include jpg, bmp and the like. The video encoding format may include H264, H265 and the like. The private information may be understood as any information that is not disclosed to the public, such as an usage right of the image capture device, and the like.

In the present embodiment, a type of the target data may be an image type, a video type or other types.

At step S202, the target data is sent, as data carried in an effective image area of a first image frame, using a data sending manner for the effective image area, through a same transmission channel as used in transmitting image data.

The transmission channel may be a coaxial cable, a twisted pair or other transmission materials, which is not specifically limited in this application. The same transmission channel may be understood as the same one line. The first image frame has a different type from a second image frame carrying image data without carrying the target data. The effective image area may also be called data area.

In this embodiment, first image frames and second image frames may be alternately sent between the data sending end and the data receiving end. The effective image area of the first image frame is configured for sending the target data, and the effective image area of the second image frame configured for sending the image data. In this way, the image data and the target data can be sent through the same transmission channel.

A coaxial cable or a twisted pair cable may be used to transmit the image data between the data sending end and the data receiving end. In order to send the target data and avoid the additional wiring, the target data may be transmitted through the same transmission channel as used in transmitting the image data.

The data sending manner may include an analog signal sending form and a digital signal sending form. The data sending manner for the effective image area may be an analog signal sending form or a digital signal sending form. That is to say, the data of the effective image area may be sent as an analog signal or as a digital signal.

As can be seen from the above, in this embodiment, the to-be-sent target data may be acquired; and the target data is sent, as data carried in an effective image area of a first image frame, using a data sending manner for the effective image area, through a same transmission channel as used in transmitting image data. The first image frame has a different type from a second image frame carrying the image data without carrying the target data. Therefore, the solution provided by the embodiment can realize that the target data is sent to the electronic device through the same transmission channel as used in transmitting the image data without the additional wiring, thereby reducing the device cost.

In this embodiment, the blanking area of the first image frame may also be configured to transmit the target data. For example, when the amount of the target data is large, and all the target data cannot be sent through the effective image area of the first image frame, the remaining target data may be sent through a part of the blanking area. This part may be a part other than a part of the blanking area for sending coaxial data. The target data in the blanking area may be sent in a form of digital signal or in a form of analog signal. The sending form of the target data in the blanking area may be consistent with the sending form of the target data in the effective image area.

The first image frames and the second image frames may be sent at intervals having a preset regularity, or may be randomly sent. The detail thereof is described in the following embodiment.

In another embodiment of the present application, before sending the target data as shown in FIG. 2, the method may further include:

performing the step S202 of sending the target data when it is determined that a preset number of second image frames have been continuously sent.

In this embodiment, the above step may include: determining whether a preset number of second image frames have been continuously sent; if it is determined that a preset number of second image frames have been continuously sent, sending the target data, as data carried in an effective image area of a first image frame, using a data sending manner for the effective image area, through the same transmission channel as used in transmitting image data.

In the embodiment, the number of first image frames for sending the target data may be preset, or may be determined based on the amount of the target data. There may be one or more first image frames for sending the target data.

When the sending of the target data is completed, a preset number of second image frames may also be continuously sent.

In the embodiment, N second image frames carrying the image data are sent, then M first image frames carrying the target data sent, then N second image frames carrying the image data are sent again, and so on. N may or may not be fixed, and M may or may not be fixed.

In the first case, N is a fixed value and M is an unfixed value. Specifically, M may be a value obtained by dividing the amount of the target data by the data amount of an effective image area of a single first image frame. For example, if 2000 rows of data may be sent by an effective image area of a single first image frame, and data of 100 kB may be transmitted by each row, data of about 0.2 MB may be transmitted by the effective image area of the single first image frame. When the amount of the target data is 2 MB, M=2 MB/0.2 MB=10 first image frames are needed to transmit the target data. Therefore, 10 first image frames are needed to transmit the target data.

Figure 3A:
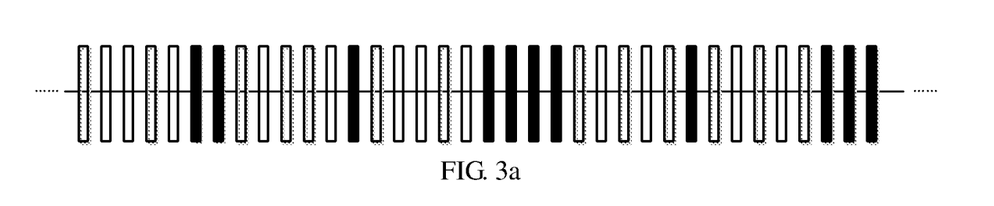
FIGS. 3a-3d are schematic diagrams of several arrangement forms of two image frames according to an embodiment of the present application, respectively.

As an example, FIG. 3*a* is a schematic diagram of an arrangement of first image frames and second image frames when being sent. Hollow rectangles represent the second image frames, and solid rectangles represent the first image frames. N is fixed as 5 frames, and M is unfixed and may be 2, 1, 4, 1, 3, and so on.

In the second case, N is a fixed value and M is a fixed value. In this embodiment, the image data and the target data are sent at fixed intervals. In this way, the sent first image frames and second image frames are evenly arranged, and when the image data is received at the data receiving end, the fluency of image preview may be ensured.

Figure 3B:
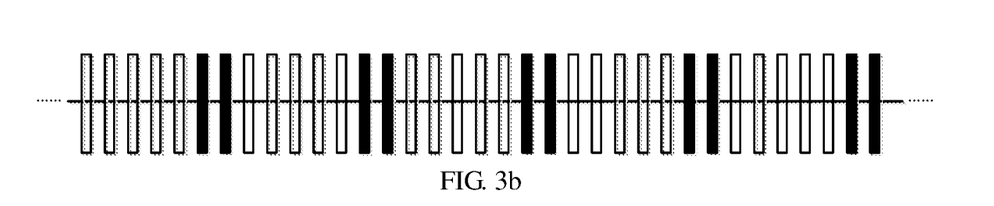

As an example, FIG. 3*b* is another schematic diagram of an arrangement of first image frames and second image frames when being sent. Hollow rectangles represent the second image frames, and solid rectangles represent the first image frames. N is fixed as 5 frames, and M is fixed as 2 frames.

In the third case, the number N of the first image frames and the number M of the second image frames may both be random, that is to say, N is an unfixed value, and M is also an unfixed value. In this case, the moment at which the target data is acquired may be unfixed, and the amount of the acquired target data each time may also be unfixed. The arrangement of the first image frames and the second image frames may be disorganized.

Figure 3C:
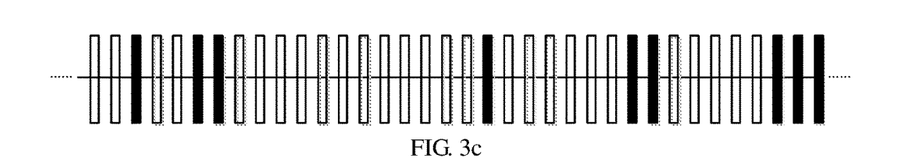

As an example, FIG. 3c is a further schematic diagram of an arrangement of first image frames and second image frames when being sent. Hollow rectangles represent the second image frames, and solid rectangles represent the first image frames. It can be seen that N and M in FIG. 3c are both random.

In the fourth case, N is an unfixed value and M is a fixed value. In this case, the moment at which the target data is acquired may be unfixed, but the amount of the acquired target data each time may be fixed.

Figure 3D:
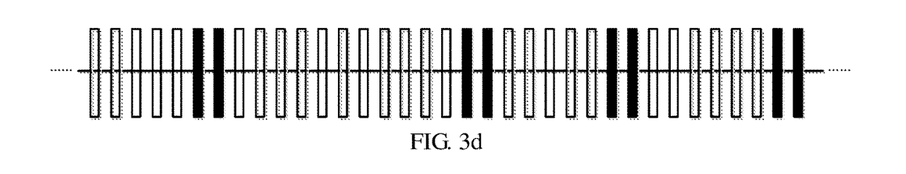

As an example, FIG. 3d is a further schematic diagram of an arrangement of first image frames and second image frames when being sent. Hollow rectangles represent the second image frames, and the solid rectangles represent the first image frames. It can be seen that N is an unfixed value, and M is fixed as 2, in FIG. 3d.

When N and/or M is an unfixed value, an image frame may be identified as a first image frame by adding coaxial data in the image frame, so that the data receiving end determines the first image frame from the received image frames. Specifically, the coaxial data may include data indicating that the data in the effective image area of the image frame is the target data, and the image frame may be determined as the first image frame based on this data.

In another embodiment of the present application, before the step S202 in the embodiment shown in FIG. 2, that is, before sending the target data, the method may further include:

when it is determined that the amount of the to-be-sent target data reaches a preset data amount threshold, performing the step of sending the target data, as data carried in an effective image area of a first image frame, using a data sending manner for the effective image area, through a same transmission channel as used in transmitting image data.

The above step may include: determining whether the amount of the to-be-sent target data reaches the preset data amount threshold, and if the amount of the to-be-sent target data reaches the preset data amount threshold, performing the step S202.

The preset data amount threshold may be a preset value. For example, the preset data amount threshold may be a maximum amount of data that may be stored in an effective image area of a single image frame, or may be a times the maximum amount of data, wherein, a is a positive integer. Alternatively, the preset data amount threshold may also be any other value.

When the preset data amount threshold is the maximum amount of data, the target data may be sent using one first image frame each time. When the preset data amount threshold is a times the maximum amount of data, a first image frames may be continuously sent each time. In case a is greater than a specified value, in order to ensure image fluency at the data receiving end, it is not possible to send no second image frame for a long time. In this case, the first and second image frames may be sent at intervals.

The position of the target data in the effective image area may be fixed or unfixed. When the position of the target data in the effective image area is unfixed, the position of the target data may be determined by a header identifier of a start position of the target data carried by the target data and an end identifier indicating an end position of the target data. The header identifier may be a first preset bit string, and the end identifier may be a second preset bit string. The front first preset number of bits in the target data may be the first preset bit string, and the rear second preset number of bits in the target data may be the second preset bit string.

In another embodiment of the present application, before the step S202 in the embodiment shown in FIG. 2, that is to say, before sending the target data, the method may further include: acquiring to-be-sent coaxial data, and sending the coaxial data, as data carried in a blanking area of the first image frame in which the target data is located, using a data sending manner for the blanking area.

Figure 3E:
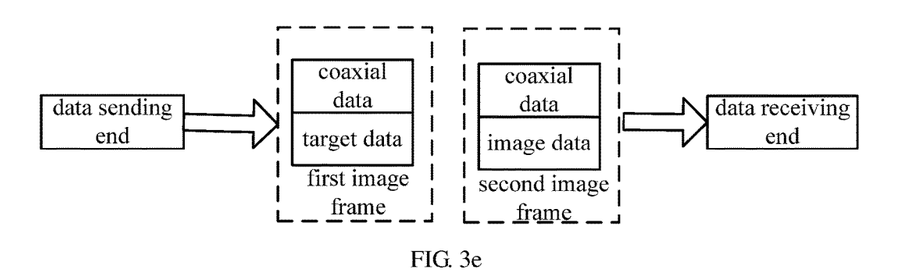
FIG. 3e is a schematic diagram of a transmission frame for two image frames according to an embodiment of the present application.

As an example, FIG. 3e is a transmission architecture diagram of sending two types of image frames to the data receiving end by the data sending end. The first image frame includes the target data and the coaxial data, and the second image frame includes the image data and the coaxial data. The coaxial data is optional, and the two image frames may not include the coaxial data.

It can be seen that, in the embodiment, both the coaxial data and the target data may be sent to the data receiving end through the first image frame, which can enrich the types of the transmitted data and improve the data transmission efficiency.

In the above embodiment, the coaxial data may further include: a coaxial data identifier indicating that data in the effective image area of the image frame is the target data. In this way, based on the coaxial data identifier in the coaxial data, the data receiving end may determine that the data of the effective image area of the image frame is the target data. In another embodiment, the coaxial data may include an identifier indicating that data in the effective image area of the image frame is not the target data. When the data of the effective image area is not the target data, the data of the effective image area may be the image data or other data, or there is no the data of the effective image area, or the like. For example, when data at a specified position of the coaxial data is 1, it indicates that the data of the effective image area of the image frame is the target data, and when the data at the specified position is 0, it indicates that the data of the effective image area of the image frame is not the target data. When receiving the image frame, the data receiving end may acquire the coaxial data from the image frame, and determines whether the data of the effective image area of the image frame is the target data based on the data at the specified position of the coaxial data.

When the first image frames and the second image frames are irregularly arranged, that is, when N and/or M are unfixed values, it can be determined which image frame carries the target data based on whether the coaxial data contains an coaxial data identifier indicating that the data in the effective image area of the image frame is the target data. When it is determined that the coaxial data contains the coaxial data identifier indicating that the data in the effective image area of the image frame is the target data, the image frame is determined as the first image frame; otherwise, the image frame is determined as the second image frame.

The coaxial data identifier indicating that the data in the effective image area of the image frame is the target data may be implemented as a specified identifier, or may be implemented by other methods, which is not specifically limited in the application.

In the above embodiment, the coaxial data may further include: data indicating a position of the target data in the effective image area. The target data may or may not fill up the effective image area. When the target data fills up the effective image area, the data indicating the position of the target data in the effective image area in the coaxial data may be the position of the effective image area. When the target data does not fill up the effective image area, the data indicating the position of the target data in the effective image area in the coaxial data may be the actual position of the target data. The data receiving end may determine the position of the target data in the effective image area based on the data in the coaxial data, and thus acquire the target data more accurately.

It can be seen that the coaxial data in the embodiment may include a coaxial data identifier indicating that data in the effective image area of the image frame is the target data, and the image frame is determined as the first image frame or the second image frame based on the coaxial data identifier, which enables the data receiving end to acquire the target data more accurately.

The present application will be further described in detail below with reference to specific examples.

The data sending end is a camera, and the data receiving end is a digital video recorder (DVR). The camera may acquire three types of data: image data, target data and coaxial data. The acquired three types of data may be stored in a cache in the form of a digital signal. The corresponding data is acquired from the cache when the sending period of the image frame comes. When the image data needs to be sent, the image data is read from the cache in the form of a digital signal, is converted into an analog signal, and is sent to the DVR using the second image frame. When the target data needs to be sent, the target data is read from the cache in the form of a digital signal, and is sent to the DVR using a complete first image frame in which the image data has not been stored. The above image data and target data are data in the effective image area of the image frame.

Both the first image frame and the second image frame may include the coaxial data. The coaxial data is located in a fixed number of rows in the blanking area of the image frame in the form of a digital signal. The coaxial data may include data indicating that data in the effective image area of the image frame is the target data. Therefore, after receiving the image frame, the DVR may determine that the data in the effective image area of the image frame is the target data based on the coaxial data.

In the embodiment, in order to enable the transmission of the target data using a complete image frame, a transmission parameter may be improved to ensure the transmission of the image data and the target data. For example, an original transmission parameter is 2MP25, which may be explained as 25 image frames transmitted per second, with each image frame having 2 million pixels. The transmission of image data may be realized originally by the transmission parameter 2MP25. In order to transmit the target data, 2MP25 may be increased to 2MP30. Thus, each time 30 image frames carrying the image data are transmitted, there are 5 image frames in which no image data is required to be stored. These idle image frames may be configured for sending the target data.

Figure 3F:
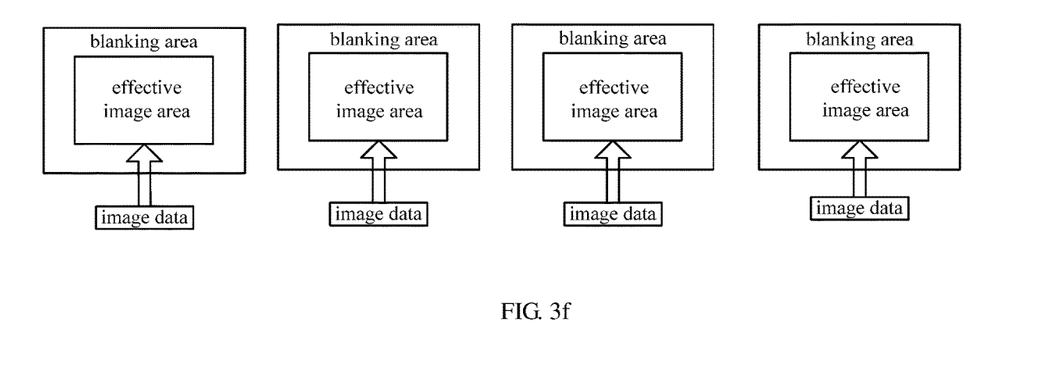
FIG. 3f is a schematic diagram of sending methods of image data and target data.

As an example, a sending manner of image frames that carry the image data and the target data, respectively, is given in FIG. 3f.

The application scene of the present application is described in detail below with reference to specific examples.

A smart camera with face detection function is installed at the gate of a company. The smart camera may monitor a person currently passing through the gate and extract the image of the person from the monitored image to get a picture in jpg format.

The specific process is as follows. A smart module provided in the camera processes intelligently an image captured by the camera. When detecting that there is a face(s) in a current scene image, the smart module generates the current number of face(s) and a position(s) of the face(s) in the image. Further, the smart module of the camera may extract a face image(s) from the image based on the position information, so that a separate jpg picture is generated for each of the face(s). The camera determines the detected number of the face(s), position(s) of the face(s), and jpg picture(s) as data of an effective image area of a specified image frame, and adds the following description to coaxial data: the current camera being a smart camera with a face capture function, the current data including face detection data, and the data of the effective image area of the current image frame being the target data. After receiving an image frame signal, the DVR parses the coaxial data, to determine that the current image frame carries the target data. The DVR then searches for the target data from the effective image area, stores the face image(s) after reading the target data, and provides subsequent customers with functions, such as searching for the face data and determining whether there are suspicious people.

Figure 4:
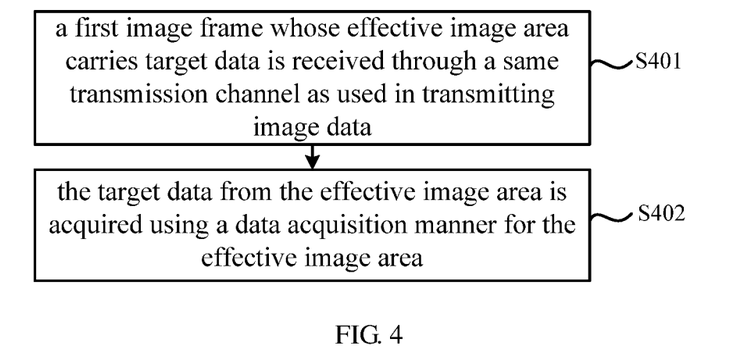
FIG. 4 is a schematic flowchart diagram of another data transmission method according to an embodiment of the present application.

FIG. 4 is a flowchart of another data transmission method according to an embodiment of the present application. The method is applied to a data receiving end, which may be a computer, a smart phone or other electronic devices with data processing function. The method includes the following steps S401 and S402.

At step S401, a first image frame whose effective image area carries target data is received through a same transmission channel as used in transmitting image data.

The target data is different from the image data and coaxial data. The coaxial data is notification information for an interaction between a data receiving end and a data sending end. The first image frame has a different type from a second image frame carrying the image data without carrying the target data.

The coaxial data may also be called PTZ data. When the data sending end and the data receiving end are a video generation end and a video receiving end respectively, coaxial data of an interaction between the video generation end and the video receiving end may include coaxial sending data sent by the video generation end to the video receiving end, and may also include coaxial receiving data sent by the video receiving end to the video generation end. The coaxial data may further include information such as a position of the image data in the image frame and a position of the target data in the image frame.

The coaxial data may or may not be included in the image frame.

When receiving image frames, the data receiving end may determine the first image frame from the received image frames based on an appointed image frame arrangement rule.

At step S402, the target data from the effective image area is acquired using a data acquisition manner for the effective image area.

In this step, the data receiving end may read the target data from the effective image area based on the appointed position of the target data.

In the embodiment, first image frames and second image frames may be alternately sent between the data sending end and the data receiving end. The effective image area of the first image frame is configured for sending the target data, and the effective image area of the second image frame is configured for sending the image data. In this way, the sending of the image data and the target data can be realized through the same transmission channel.

A coaxial cable or a twisted pair cable may be used to transmit the image data between the data sending end and the data receiving end. In order to send the target data and avoid the additional wiring, the target data may be transmitted through the same transmission channel as used in transmitting the image data.

The data acquisition manner may include an analog signal acquisition form and a digital signal acquisition form. The data acquisition manner for the effective image area may be an analog signal acquisition form or a digital signal acquisition form. That is to say, the data of the effective image area may be an analog signal or a digital signal.

It can be seen that in the embodiment, the first image frame whose effective image area carries the target data may be received through the same transmission channel as used in transmitting the image data, and the target data may be acquired from the first image frame. In this way, the receiving of the target data can be realized without the additional wiring, thereby reducing the cost.

The first image frames and the second image frames may be sent at intervals having a preset regularity, or may be randomly sent. Therefore, in receiving an image frame, the data receiving end may determine the received image frame based on different rules. The details will be described below.

In another embodiment of the present application, the step S401 of receiving a first image frame whose effective image area carries target data in the embodiment shown in FIG. 4 may include:

when it is determined that a preset number of second image frames have been continuously received, receiving an image frame and determining the received image frame as the first image frame whose effective image area carries the target data.

In the embodiment, the above step may include: determining whether the preset number of the second image frames have been continuously received; when it is determined that the preset number of the second image frames have been continuously received, receiving the image frame and determining the received image frame as the first image frame whose effective image area carries the target data.

In the embodiment, the number of first image frames for sending the target data may or may not be preset. There may be one or more first image frames for sending the target data.

After receiving the first image frame, it is also possible to continuously receive a preset number of second image frames.

In the embodiment, N second image frames carrying image data are received, then M first image frames carrying target data are received, then N second image frames carrying image data are received again, and so on. N may or may not be a fixed value, and M may or may not be a fixed value.

In the first case, N is a fixed value and M is an unfixed value. In the second case, N is a fixed value and M is a fixed value. In the third case, N is an unfixed value and M is also an unfixed value. In the fourth case, N is an unfixed value and M is a fixed value. For the first case, the third case and the fourth case, the data receiving end may determine that the image frame is the first image frame based on the coaxial data carried in the image frame. A position of the coaxial data in a blanking area is fixed. The coaxial data may include data indicating that the data in the effective image area of the image frame is the target data, and the data receiving end may determine this image frame as the first image frame based on this data. In this way, the data receiving end may determine the first image frame more accurately and acquire the target data. For the second case, the data receiving end may determine the first image frame from the received image frame based on the appointed image frame arrangement rule. In this embodiment, the image frame may or may not carry coaxial data. Since in this embodiment, the arrangement of the first image frames and the second image frames is regular, the data receiving end may display the image data more smoothly after receiving the image frame.

In another embodiment of the present application, in the embodiment shown in FIG. 4, the blanking area of the first image frame may carry the coaxial data; after receiving the first image frame, the method may further include:

acquiring the coaxial data from the blanking area using the data acquisition manner for the blanking area.

In the embodiment, the data acquisition manner for the blanking area may be a digital signal acquisition form, by which the coaxial data may be acquired from the blanking area. The coaxial data may be stored in a fixed number of rows in the blanking area. The coaxial data may be acquired from the appointed position.

It can be seen that, in the embodiment, the coaxial data may be acquired from the blanking area of the first image frame. Therefore, the target data and the coaxial data can be simultaneously obtained through the first image frame, which enriches the types of the acquired data and improves the data transmission efficiency.

In another embodiment of the present application, in the embodiment shown in FIG. 4, the coaxial data may be acquired before the target data is acquired. Before the step S402 of acquiring the target data from the effective image area, the method further includes:

when it is determined that the coaxial data includes a coaxial data identifier indicating that the data in the effective image area of the image frame is the target data, performing the step of acquiring the target data from the effective image area.

This step may include: determining whether the coaxial data includes a coaxial data identifier indicating that the data in the effective image area of the image frame is the target data; if the coaxial data includes the coaxial data identifier, performing the step of acquiring the target data from the effective image area; and if the coaxial data does not include the coaxial data identifier, performing the step of acquiring the target data from the effective image area.

When it is determined that the coaxial data does not include the coaxial data identifier indicating that the data in the effective image area of the image frame is the target data, it indicates that the effective image area in the image frame have no target data, and it is not necessary to acquire the target data from the effective image area.

When the first and second image frames are irregularly arranged, that is, N and/or M are unfixed values, it can be determined which image frame carries the target data based on whether the coaxial data contains the coaxial data identifier indicating that the data in the effective image area of the image frame is the target data. When it is determined that the coaxial data contains the coaxial data identifier indicating that the data in the effective image area of the image frame is the target data, the image frame is determined as the first image frame; otherwise, the image frame is determined as the second image frame.

The coaxial data identifier indicating that the data in the effective image area of the image frame is the target data may be implemented as a specified identifier, or may be implemented by other manners, which is not specifically limited in this application. The coaxial data may also include an identifier indicating that the data of the effective image area of the image frame is not the target data. Specifically, data at a specified position of the coaxial data may be used for indicating whether the data of the effective image area is the target data. When receiving the image frame, the data receiving end may acquire the coaxial data from the image frame, and may determine whether the data of the effective image area of the image frame is the target data based on the data at the specified position of the coaxial data.

In the above embodiment, the coaxial data may further include: data indicating the position of the target data in the effective image area. The target data may or may not fill up the effective image area. When the target data fills up the effective image area, the data indicating the position of the target data in the effective image area in the coaxial data may be the position of the effective image area. When the target data does not fill up the effective image area, the data indicating the position of the target data in the effective image area in the coaxial data may be the actual position of the target data. The data receiving end may determine the position of the target data in the effective image area based on the data in the coaxial data, and thus acquire the target data more accurately.

In another embodiment, the target data may include a plurality of pieces of sub-data of different subjects. The positions of the pieces of sub-data in the first image frame may be continuous or discontinuous. The coaxial data may include at least one of: data indicating a subject of each sub-data, the number of the pieces of sub-data, and the positions of the pieces of sub-data. For example, the target data includes face image sub-data and vehicle image sub-data; the coaxial data may include: first sub-data being the face image data, second sub-data being the vehicle image sub-data, the number of face images, the number of vehicle images, positions of the face images, positions of the vehicle images, and so on.

It can be seen that, in this embodiment, the target data may be acquired from the effective image area based on the coaxial data identifier, such that the data receiving end can acquire the target data more accurately.

Figure 5:
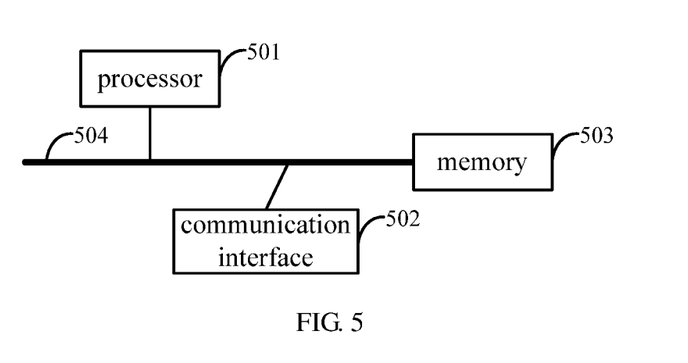
FIG. 5 is a schematic structural diagram of a camera according to an embodiment of the present application.

FIG. 5 is a schematic structural diagram of a camera according to an embodiment of the present application. This embodiment corresponds to the embodiment of the method shown in FIG. 2. The camera includes a processor 501, a communication interface 502, a memory 503 and a communication bus 504. The processor 501, the communication interface 502 and the memory 503 communicate with each other via the communication bus 504.

The processor 501 is configured for: acquiring to-be-sent target data; and sending the target data, as data carried in an effective image area of a first image frame, by using a data sending manner for the effective image area, through a same transmission channel as used in transmitting image data; wherein the target data is different from the image data and coaxial data, the coaxial data is notification information for an interaction between a data receiving end and a data sending end, and the first image frame has a different type from a second image frame carrying the image data without carrying the target data.

The memory 502 is configured for storing the target data acquired by the processor 501. Specifically, the memory may be a cache.

In another embodiment of the present application, in the embodiment shown in FIG. 5, the processor 501 may be further configured for: before sending the target data, when determining that a preset number of second image frames have been continuously sent, sending the target data, as data carried in the effective image area of the first image frame, by using the data sending manner for the effective image area, through the same transmission channel as used in transmitting the image data.

In another embodiment of the present application, in the embodiment shown in FIG. 5, the processor 501 may be further configured for: when the sending of the target data is completed, continuously sending the preset number of second image frames.

In another embodiment of the present application, in the embodiment shown in FIG. 5, the processor 501 may be further configured for: when determining that an amount of the to-be-sent target data reaches a preset data amount threshold, sending the target data, as data carried in the effective image area of the first image frame, by using the data sending manner for the effective image area, through the same transmission channel as used in transmitting the image data.

In another embodiment of the present application, in the embodiment shown in FIG. 5, the processor 501 may be further configured for: before sending the target data, acquiring to-be-sent coaxial data, and sending the coaxial data, as data carried in a blanking area of the first image frame in which the target data is located, by using a data sending manner for the blanking area.

In another embodiment of the present application, in the embodiment shown in FIG. 5, the coaxial data may further include a coaxial data identifier indicating that data in the effective image area of the image frame is the target data.

In another embodiment of the present application, in the embodiment shown in FIG. 5, the target data may specifically include: target data indicating environmental information of an environment in which an image capture device is located, of the image data; and/or, target data indicating audio information captured by the image capture device, of the image data; and/or, target data indicating image information of the image data.

The above described embodiment of the camera is obtained based on the embodiment of the method, and brings the same technical effects as the method. Therefore, the technical effects of the embodiment of the camera are not described herein again. The embodiment of the camera is described briefly, since it is substantially similar to the embodiment of the method. The related contents can refer to the description of the embodiment of the method shown in FIG. 2.

Figure 6:
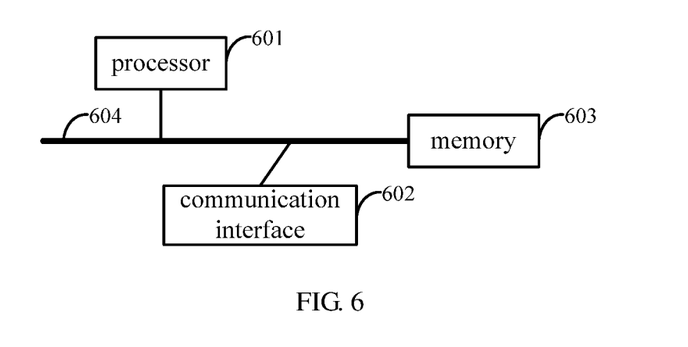
FIG. 6 is a schematic structural diagram of an electronic device according to an embodiment of the present application.

FIG. 6 is a schematic structural diagram of an electronic device according to an embodiment of the present application. This embodiment corresponds to the embodiment of the method shown in FIG. 4. The electronic device includes a processor 601, a communication interface 602, a memory 603 and a communication bus 604. The processor 601, the communication interface 602 and the memory 603 communicate with each other via the communication bus 604.

The processor 601 is configured for: receiving a first image frame whose effective image area carries target data, through a same transmission channel as used in transmitting image data; and acquiring the target data from the effective image area by using a data acquisition manner for the effective image area; wherein the target data is different from the image data and coaxial data, the coaxial data is notification information for an interaction between a data receiving end and a data sending end, and the first image frame has a different type from a second image frame carrying the image data without carrying the target data.

The memory 603 is configured for storing the target data acquired by the processor 601.

In this embodiment, the electronic device may be a DVR device. The DVR device may specifically include: a digital-to-analog (AD) conversion module, a main chip, a display, an interface and a hard disk. The main chip may include a digital signal processing (DSP) encoding module, a DSP decoding module and a CPU. The hard disk may be a ROM memory. The electronic device may perform live webcast on the image data in the received image frame.

In another embodiment of the present application, in the embodiment shown in FIG. 6, the processor 601, when receiving a first image frame whose effective image area carries the target data, is configured for: when determining that a preset number of second image frames have been continuously received, receiving an image frame and determining the received image frame as the first image frame whose effective image area carries the target data.

In another embodiment of the present application, in the embodiment shown in FIG. 6, the processor 601 may be further configured for: after receiving the first image frame, continuously receiving the preset number of second image frames.

In another embodiment of the present application, in the embodiment shown in FIG. 6, a blanking area of the first image frame carries the coaxial data. The processor 601 is further configured for: after receiving the first image frame, acquiring the coaxial data from the blanking area by using a data acquisition manner for the blanking area.

In another embodiment of the present application, in the embodiment shown in FIG. 6, the coaxial data is acquired before the target data is acquired. The processor 601 may be further configured for: before acquiring the target data from the effective image area, when determining that the coaxial data includes data indicating that data in the effective image area of the image frame is the target data, acquiring the target data from the effective image area by using the data acquisition manner for the effective image area.

The above described embodiment of the electronic device is obtained based on the embodiment of the method, and brings the same technical effects as the method. Therefore, the technical effects of the embodiment of the electronic device are not described herein again. The embodiment of the electronic device is described briefly, since it is substantially similar to the embodiment of the method. The related contents can refer to the description of the embodiment of the method shown in FIG. 4.

In the above embodiments of the camera and the electronic device, the communication bus may be a peripheral component interconnect (PCI) bus, an extended industry standard architecture (EISA) bus, or the like. The communication bus may include an address bus, a data bus, a control bus, and the like. For representation, the communication bus in the figure is only indicated by a thick line, which does not mean that there is only one bus or one type of bus.

The communication interface is configured for communication between the above described device and other devices.

The memory may include a random access memory (RAM), or may include non-volatile memory (NVM), for example at least one disk memory. Optionally, the memory may also be at least one storage apparatus located away from the processor described above.

The processor may be a general-purpose processor, including a central processing unit (CPU), a network processor (NP), etc., or may be a DSP, an application specific integrated circuit (ASIC), a field-programmable gate array (FPGA) or other programmable logic elements, discrete gates or transistor logic elements, discrete hardware components.

An embodiment of the present application further provides a computer readable storage medium for storing a computer program, wherein the computer program, when executed by a processor, performs the data transmission method according to the embodiment of the present application. The data transmission method includes:

acquiring to-be-sent target data, wherein the target data is different from image data and coaxial data, and the coaxial data is notification information for an interaction between a data receiving end and a data sending end; and sending the target data, as data carried in an effective image area of a first image frame, by using a data sending manner for the effective image area, through a same transmission channel as used in transmitting the image data; wherein the first image frame has a different type from a second image frame carrying the image data without carrying the target data.

It can be seen that, in the embodiment, to-be-sent target data may be acquired, and the target data is sent, as data carried in an effective image area of a first image frame, by using a data sending manner for the effective image area, through a same transmission channel as used in transmitting the image data, wherein, the first image frame has a different type from that of a second image frame carrying the image data without carrying the target data. Therefore, the solution provided by the embodiment can realize that the target data is sent to the electronic device through the same transmission channel as used in transmitting the image data without additional wiring, thereby reducing the device cost.

An embodiment of the present application further provides a computer readable storage medium for storing a computer program, wherein the computer program, when executed by a processor, performs another data transmission method according to the embodiment of the present application. The data transmission method is as follows.

It can be seen that in the embodiment a first image frame whose effective image area carries target data may be received through a same transmission channel as used in transmitting the image data, and the target data may be acquired from the first image frame. In this way, the receiving of the target data can be realized without additional wiring, thereby reducing the cost.

It should be noted that the relationship terms herein such as "first", "second" and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements include not only those elements listed but also those not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. The description for each embodiment focuses on the differences from other embodiments.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A data transmission method, comprising:
acquiring to-be-sent target data, wherein the target data is different from image data and coaxial data, and the coaxial data is notification information for an interaction between a data receiving end and a data sending end; wherein the target data comprises: target data indicating environmental information of an environment in which an image capture device is located, of the image data; and/or, target data indicating audio information captured by the image capture device, of the image data; and/or, target data indicating image information of the image data; and
sending a preset number of second image frames, then when it is determined that the preset number of second image frames have been continuously sent, sending the target data, as data carried in an effective image area of a first image frame, by using a data sending manner for the effective image area, through a same transmission channel as used in transmitting the image data, then when the sending of the target data is completed, continuously sending the preset number of second image frames;
wherein the first image frame has a different type from a second image frame carrying the image data without carrying the target data;
wherein the first image frame and the second image frame are alternately sent.

2. The method of claim 1, wherein, before sending the target data, the method further comprises:
when it is determined that an amount of the to-be-sent target data reaches a preset data amount threshold, performing the step of sending the target data,
or, wherein before sending the target data, the method further comprises:
acquiring to-be-sent coaxial data;
sending the coaxial data, as data carried in a blanking area of the first image frame in which the target data is located, by using a data sending manner for the blanking area, wherein the coaxial data further comprises: a coaxial data identifier indicating that data in the effective image area of the image frame is the target data.

3. A data transmission method, comprising:
receiving a first image frame whose effective image area carries target data, through a same transmission channel as used in transmitting image data; wherein the target data is different from the image data and coaxial data, the coaxial data is notification information for an interaction between a data receiving end and a data sending end, and the first image frame has a different type from a second image frame carrying the image data without carrying the target data; wherein the target data comprises: target data indicating environmental information of an environment in which an image capture device is located, of the image data; and/or, target data indicating audio information captured by the image capture device, of the image data; and/or, target data indicating image information of the image data; and
acquiring the target data from the effective image area by using a data acquisition manner for the effective image area;
wherein the first image frame and the second image frame are alternately sent;
wherein receiving a first image frame whose effective image area carries target data comprises:
receiving a preset number of second image frames, then when it is determined that the preset number of second image frames have been continuously received, receiving an image frame and determining the received image frame as the first image frame whose effective image area carries the target data; then after receiving the first image frame, continuously receiving the preset number of second image frames.

4. The method of claim 3, wherein, a blanking area of the first image frame carries the coaxial data; after receiving the first image frame, the method further comprises:
acquiring the coaxial data from the blanking area by using a data acquisition manner for the blanking area.

5. The method of claim 4, wherein, the coaxial data is acquired before the target data is acquired; before acquiring the target data from the effective image area, the method further comprises:
when it is determined that the coaxial data comprises a coaxial data identifier indicating that data in the effective image area of the image frame is the target data, performing the step of acquiring the target data from the effective image area.

6. A camera, comprising: a processor, a communication interface, a memory and a communication bus; wherein, the processor, the communication interface and the memory communicate with each other via the communication bus;
the processor is configured for: acquiring to-be-sent target data; and sending the target data, as data carried in an effective image area of a first image frame, by using a data sending manner for the effective image area, through a same transmission channel as used in transmitting image data;
wherein the target data is different from the image data and coaxial data, the coaxial data is notification information for an interaction between a data receiving end and a data sending end, wherein the target data comprises: target data indicating environmental information of an environment in which an image capture device is located, of the image data; and/or, target data indicating audio information captured by the image capture device, of the image data; and/or, target data indicating image information of the image data; and the first image frame has a different type from a second image frame carrying the image data without carrying the target data; wherein the first image frame and the second image frame are alternately sent;
the memory is configured for storing the target data acquired by the processor;
wherein, the processor is further configured for: before sending the target data, sending a preset number of second image frames, then when determining that the preset number of second image frames have been continuously sent, sending the target data, as data carried in the effective image area of the first image frame, by using the data sending manner for the effective image area, through the same transmission channel as used in transmitting the image data;

wherein, the processor is further configured for: when the sending of the target data is completed, continuously sending the preset number of second image frames.

7. The camera of claim 6, wherein, the processor is further configured for: before sending the target data, when determining that an amount of the to-be-sent target data reaches a preset data amount threshold, sending the target data, as data carried in the effective image area of the first image frame, by using the data sending manner for the effective image area, through the same transmission channel as used in transmitting the image data, or, wherein the processor is further configured for: before sending the target data, acquiring to-be-sent coaxial data, and sending the coaxial data, as data carried in a blanking area of the first image frame in which the target data is located, by using a data sending manner for the blanking area, wherein, the coaxial data further comprises: a coaxial data identifier indicating that data in the effective image area of the image frame is the target data.

8. An electronic device, comprising: a processor, a communication interface, a memory and a communication bus; wherein, the processor, the communication interface and the memory communicate with each other via the communication bus;

the processor is configured for: receiving a first image frame whose effective image area carries target data, through a same transmission channel as used in transmitting image data; and acquiring the target data from the effective image area by using a data acquisition manner for the effective image area;

wherein the target data is different from the image data and coaxial data, the coaxial data is notification information for an interaction between a data receiving end and a data sending end, and the first image frame has a different type from a second image frame carrying the image data without carrying the target data; wherein the target data comprises: target data indicating environmental information of an environment in which an image capture device is located, of the image data; and/or, target data indicating audio information captured by the image capture device, of the image data; and/or, target data indicating image information of the image data; and the memory is configured for storing the target data acquired by the processor;

wherein the first image frame and the second image frame are alternately sent;

wherein, the processor, when receiving the first image frame whose effective image area carries target data, is configured for: receiving a preset number of second image frames, then when determining that the preset number of second image frames have been continuously received, receiving an image frame and determining the received image frame as the first image frame whose effective image area carries the target data;

wherein, the processor is further configured for: after receiving the first image frame, continuously receiving the preset number of second image frames.

9. The electronic device of claim 8, wherein, a blanking area of the first image frame carries the coaxial data; the processor is further configured for: after receiving the first image frame, acquiring the coaxial data from the blanking area by using a data acquisition manner for the blanking area.

10. The electronic device of claim 9, wherein, the coaxial data is acquired before the target data is acquired; the processor is further configured for: when determining that the coaxial data comprises a coaxial data identifier indicating that data in the effective image area of the image frame is the target data, acquiring the target data from the effective image area by using the data acquisition manner for the effective image area.

11. A non-transitory computer readable storage medium for storing a computer program, wherein the computer program, when executed by a processor, performs the method of claim 1.

12. A non-transitory computer readable storage medium for storing a computer program, wherein the computer program, when executed by a processor, performs the method of claim 3.

* * * * *